United States Patent
Arora et al.

(10) Patent No.: US 11,792,012 B2
(45) Date of Patent: *Oct. 17, 2023

(54) DISTRIBUTED BIOMETRIC COMPARISON FRAMEWORK

(71) Applicant: Visa International Service Association, San Francisco, CA (US)

(72) Inventors: Sunpreet Singh Arora, San Jose, CA (US); Lacey Best-Rowden, San Mateo, CA (US); Kim Wagner, Sunnyvale, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/683,846

(22) Filed: Mar. 1, 2022

(65) Prior Publication Data

US 2022/0191032 A1 Jun. 16, 2022

Related U.S. Application Data

(63) Continuation of application No. 16/980,293, filed as application No. PCT/US2018/023365 on Mar. 20, 2018, now Pat. No. 11,296,888.

(51) Int. Cl.
*H04L 9/40* (2022.01)
*H04L 9/32* (2006.01)
*H04L 9/08* (2006.01)

(52) U.S. Cl.
CPC ............ *H04L 9/3231* (2013.01); *H04L 9/085* (2013.01); *H04L 9/321* (2013.01)

(58) Field of Classification Search
CPC ............ H04L 63/0884; H04L 63/0853; H04L 63/0861; H04L 9/321; H04L 9/085; H04L 9/3231; G06F 21/32
See application file for complete search history.

(56) References Cited

U.S. PATENT DOCUMENTS 9,935,947 B1 * 4/2018 Machani ............ H04L 63/0861
11,296,888 B2 * 4/2022 Arora ...................... H04L 9/008
(Continued)

FOREIGN PATENT DOCUMENTS

KR  20090042143 A  4/2009
KR  20110033281 A  3/2011
(Continued)

OTHER PUBLICATIONS

IN202047043340, "First Examination Report", dated Jul. 21, 2022, 7 pages.
(Continued)

*Primary Examiner* — Thaddeus J Plecha
(74) *Attorney, Agent, or Firm* — Kilpatrick Townsend & Stockton LLP

(57) ABSTRACT

A method is disclosed. An authentication node may receive a plurality of encrypted match values, wherein the plurality of encrypted match values were formed by a plurality of worker nodes that compare a plurality of encrypted second biometric template parts derived from a second biometric template to a plurality of encrypted first biometric template parts derived from a first biometric template. The authentication node may decrypt the plurality of encrypted match values resulting in a plurality of decrypted match values. The authentication node may then determine if a first biometric template matches the second biometric template using the plurality of decrypted match values. An enrollment node may be capable of enrolling a biometric template and storing encrypted biometric template parts at worker nodes.

13 Claims, 8 Drawing Sheets

(56) References Cited

U.S. PATENT DOCUMENTS

| | | | |
|---|---|---|---|
| 11,568,038 B1* | 1/2023 | Kulkarni | H04L 9/3271 |
| 2012/0005736 A1 | 1/2012 | Takahashi et al. | |
| 2014/0162676 A1 | 6/2014 | Shaw | |
| 2015/0089243 A1 | 3/2015 | Veugen | |
| 2015/0381348 A1* | 12/2015 | Takenaka | H04L 9/3093 |
| | | | 380/30 |
| 2016/0135046 A1 | 5/2016 | John Archibald et al. | |
| 2016/0253670 A1 | 9/2016 | Kim et al. | |
| 2017/0124348 A1 | 5/2017 | Pourzandi et al. | |
| 2017/0243225 A1 | 8/2017 | Kohli | |
| 2017/0324736 A1 | 11/2017 | Connell, II et al. | |
| 2017/0357981 A1* | 12/2017 | Azzam | G06Q 20/40145 |
| 2018/0129797 A1* | 5/2018 | Rush | G06F 21/32 |
| 2018/0212960 A1 | 7/2018 | Sandeep et al. | |
| 2018/0225506 A1 | 8/2018 | Lambert et al. | |
| 2019/0214022 A1 | 7/2019 | Vaquero Aviles-casco et al. | |

FOREIGN PATENT DOCUMENTS

| | | |
|---|---|---|
| KR | 20160049069 A | 5/2016 |
| KR | 101774151 B1 | 9/2017 |
| WO | 2006111205 A1 | 10/2006 |
| WO | 2017168194 A1 | 10/2017 |
| WO | 2017216796 A1 | 12/2017 |

OTHER PUBLICATIONS

SG11202008688V , "Written Opinion", dated Jul. 24, 2022, 9 pages.

U.S. Appl. No. 16/980,293 , "First Action Interview Pilot Program Pre-Interview Communication", dated Sep. 14, 2021, 5 pages.

U.S. Appl. No. 16/980,293 , "Notice of Allowance", dated Dec. 3, 2021, 15 pages.

Bringer et al., "Privacy-Preserving Biometric Identification Using Secure Multiparty Computation: An Overview and Recent Trends", IEEE Signal Processing Magazine, vol. 30, No. 2, Mar. 2013, pp. 42-52.

EP18910546.3 , "Extended European Search Report", dated Mar. 4, 2021, 7 pages.

Pagnin et al., "Privacy-Preserving Biometric Authentication: Challenges and Directions", Security and Communication Networks, vol. 2017, Jan. 1, 2017, 9 pages.

PCT/US2018/023365 , "International Preliminary Report on Patentability", dated Oct. 1, 2020, 9 pages.

PCT/US2018/023365 , "International Search Report and Written Opinion Received", dated Dec. 11, 2018, 12 pages.

Rane et al., "Secure Biometrics: Concepts, Authentication Architectures, and Challenge", IEEE Signal Processing Magazine, vol. 30, No. 5, Sep. 1, 2013, pp. 51-64.

* cited by examiner

DISTRIBUTED BIOMETRIC COMPARISON FRAMEWORK

CROSS-REFERENCES TO RELATED APPLICATIONS

This application is a continuation of U.S. application Ser. No. 16/980,293, filed Sep. 11, 2020, which is a National Stage of International Application No. PCT/US2018/023365, filed on Mar. 20, 2018, which are herein incorporated by reference in their entirety.

BACKGROUND

In current methods and systems it is standard practice to obtain a first biometric template from a user so that the user can later authenticate themselves by inputting a second biometric template. The first biometric template is encrypted and stored in a central repository (i.e., a database) or a user's device. The central repository and the user's device can be secured by state-of-the-art encryption techniques. However, the central repository and the user's device serve as a single point of vulnerability for the stored biometric templates. In the case of the central repository, a single security breach (e.g., by a malicious party) will result in thousands or even millions of biometric templates being compromised. This is problematic because the user cannot change their biometric associated with the compromised biometric template.

Additionally, upon receiving an encrypted second biometric template, the central repository or the user's device must decrypt the encrypted second biometric template. This is because the central repository or the user's device compares the first biometric template and the second biometric template, not the encrypted biometric templates. The encrypted first biometric template that was previously stored is also be decrypted. The decrypted first biometric template is then compared to the decrypted second biometric template. For example, an identification operation, such as a 1:N comparison, will result in the decryption of thousands or even millions of stored templates during the comparison phase. During this phase, the decrypted biometric templates are vulnerable to being compromised since the biometric templates no longer have the security of being encrypted.

Another problem is that a complete biometric template is encrypted and stored in the central repository or the user's device. If the encrypted complete biometric template were to be compromised by a malicious party, they would have access to the complete biometric template.

Embodiments of the invention address these and other problems individually and collectively.

SUMMARY

One embodiment of the invention is directed to a method comprising: receiving, by an authentication node, a plurality of encrypted match values, wherein the plurality of encrypted match values were formed by a plurality of worker nodes that compare a plurality of encrypted second biometric template parts derived from a second biometric template to a plurality of encrypted first biometric template parts derived from a first biometric template; decrypting, by the authentication node, the plurality of encrypted match values resulting in a plurality of decrypted match values; and determining, by the authentication node, if a first biometric template matches the second biometric template using the plurality of decrypted match values.

Another embodiment of the invention is directed to an authentication node comprising: a processor; a memory device; and a computer-readable medium coupled to the processor, the computer-readable medium comprising code executable by the processor for implementing a method comprising: receiving a plurality of encrypted match values, wherein the plurality of encrypted match values were formed by a plurality of worker nodes that compare a plurality of encrypted second biometric template parts derived from a second biometric template to a plurality of encrypted first biometric template parts derived from a first biometric template; decrypting the plurality of encrypted match values resulting in a plurality of decrypted match values; and determining if a first biometric template matches the second biometric template using the plurality of decrypted match values.

Another embodiment of the invention is directed to a method comprising: storing, by a worker node, an encrypted first biometric template part; comparing, by the worker node, the encrypted first biometric template part and an encrypted second biometric template part resulting in an encrypted match value; and transmitting, by the worker node, the encrypted match value to an authentication node.

Another embodiment of the invention is directed to a worker node comprising: a processor; a memory device; and a computer-readable medium coupled to the processor, the computer-readable medium comprising code executable by the processor for implementing a method comprising: storing an encrypted first biometric template part; comparing the encrypted first biometric template part and an encrypted second biometric template part resulting in an encrypted match value; and transmitting the encrypted match value to an authentication node.

These and other embodiments are described in further detail below, with reference to the Figures and Detailed Description.

DETAILED DESCRIPTION

Figure 1:
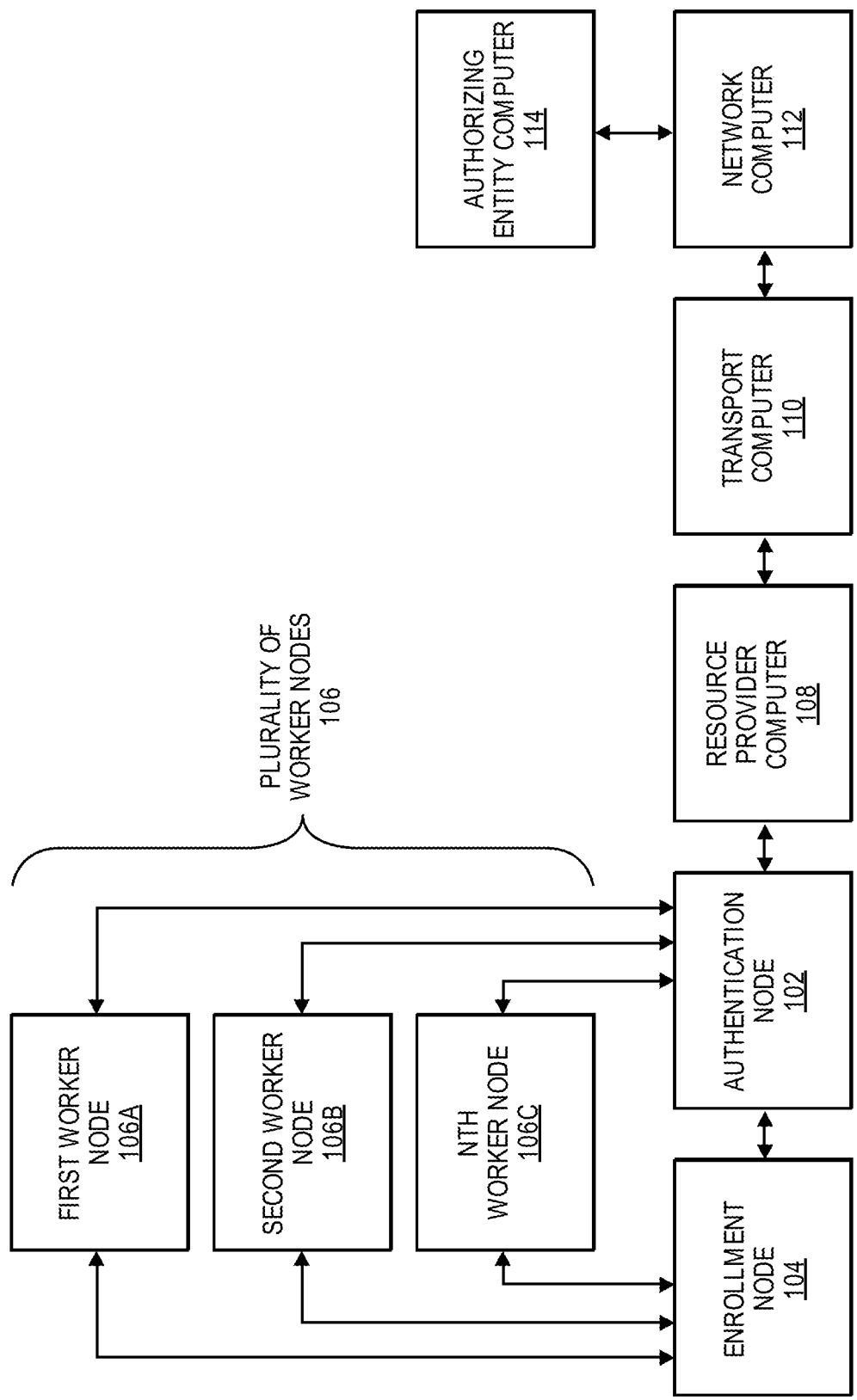
FIG. 1 shows a block diagram of a system according to an embodiment of the invention.

Prior to discussing embodiments of the invention, some terms can be described in further detail.

A "node" may be a device or system attached to or within a network. A node may be used for communicating with other nodes, a communication network, or any other suitable system. A node may generally be located in any suitable location, such as at the location of a user. A node may be in any suitable form. Some examples of nodes include POS or point of sale devices (e.g., POS terminals), cellular phones, personal digital assistants (PDAs), personal computers (PCs), tablet PCs, hand-held specialized readers, wearable devices (e.g., smart watches), vehicles with communication capabilities (e.g., smart cars), home assistant devices, household appliances, household devices (e.g., TV), set-top boxes, electronic cash registers (ECRs), automated teller machines (ATMs), virtual cash registers (VCRs), kiosks, security systems, access systems, and the like. In some embodiments, a node can be a user device. In some embodiments, where a node may comprise a smart phone, any suitable smart phone may be used and may include a biometric reader, a processor, and a computer-readable medium. In some embodiments, a node may be an enrollment node, an authentication node, or a worker node.

An "enrollment node" may be a node capable of performing enrollment. An enrollment node may allow a user to enroll a biometric template. An enrollment node may be in any suitable form and may generally be located in any suitable location, such as at the location of a user. In some embodiments, the enrollment node may be a smartphone operated by the user.

An "authentication node" may be a node capable of performing authentication. An authentication node may allow a user to authenticate a biometric template with a previously stored biometric template. An authentication node may generally be located in any suitable location, such as at the location of a user. Authentication nodes may be in any suitable form. In some embodiments, the authentication node may be a smartphone operated by a user. The authentication node may prompt the user to input a biometric sample when the user has initiated an interaction that requires authentication, such as a transaction with a merchant.

A "worker node" may be a node capable of performing computations. A worker node may store encrypted biometric template parts. A worker node may be capable of comparing an encrypted first biometric template part to an encrypted second biometric template part. In some embodiments, there may be a plurality of worker nodes. The plurality of worker nodes may be in any suitable configuration. The plurality of worker nodes may be located at any suitable location, such as at a user's residence. In some embodiments, the worker nodes of the plurality of worker nodes may be at different locations from one another. In some embodiments, the plurality of worker nodes may be devices owned by the user. For example, the worker nodes may be the user's laptop computer, the user's smart watch, the user's television, and the user's home assistant device.

An "application" may be a computer program or piece of software that is used for a specific purpose. An application may be programmed using any suitable computer language such as, for example, Java, C, C++, C#, Objective-C, Swift, or scripting language such as Perl or Python using, for example, conventional or object-oriented techniques. For example, an application may be a payment application configured to perform a payment transaction. In some embodiments, an application may be stored in a memory of a device or node.

A "user" may include an individual. In some embodiments, a user may be associated with one or more personal accounts and/or user devices.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that may be obtained and used by an entity to encrypt information. The public key may be designed to be shared and may be configured such that any information encrypted with the public key may only be decrypted using a private key associated with the public key (i.e., a public/private key pair).

A "private key" may include a cryptographic key that may be protected and secure. For example, the private key may be securely stored at an entity that generates a public/private key pair and may be used to decrypt any information that has been encrypted with the associated public key of the public/private key pair. A private key may be configured such that it may decrypt information.

A "public/private key pair" may include a pair of linked cryptographic keys generated by an entity. The public key may be used for encrypting information to send to the entity or for verifying a digital signature which was supposedly made by the entity. The private key, on the other hand may be used for decrypting received information or applying a digital signature. The public key will usually be authorized by a body known as a certification authority (i.e., certificate authority) which may store the public key in a database and may distribute it to any other entity which requests the public key. The private key may typically be kept in a secure storage medium and will usually only be known to the entity. However, the cryptographic systems described herein may feature key recovery mechanisms for recovering lost keys and avoiding data loss.

The term "secure multi-party computation" may refer to a multi-party computation which is secure. Multi-party computation may allow multiple parties to perform a computation amongst themselves. In many cases, in secure multi-party computation, the parties do not share information or other inputs with one another. Secure multi-party computation may allow the parties to jointly compute a function over their inputs while keeping those inputs private. As an example, two parties may wish to know which one of them is more wealthy, without revealing their wealth to each other. The two parties could use a secure multi-party computation technique, such as garbled circuits, in order to accomplish this.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand, or voice needed for performing accurate authentication of the individual.

The term "interaction" may be a reciprocal action, effect, or influence. An interaction, for example, could be an exchange or transaction between two or more parties. Examples of transactions can include payment transactions, data access transactions, and location access transactions.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

"Access data" may include any suitable data that can be used to access a resource or create data that can access a resource. In some embodiments, access data may be account information for a payment account. Account information may include a PAN (primary account number or "account number"), payment token, expiration date, card verification values (e.g., CVV, CVV2), dynamic card verification values (dCVV, dCVV2), etc. In other embodiments, access data could include data that can be used to access a location or to access secure data. Such information may be ticket information for an event, data to access a building, transit ticket information, passwords, biometrics or other credentials to access secure data, etc.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN, a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "merchant" may typically be an entity that engages in transactions and can sell goods or services, or provide access to goods or services. In some embodiments, a merchant may be a resource provider and may be associated with a resource provider computer.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processing computer" may be any suitable computation apparatus that can process data. In some embodiments, processing computers may be remotely located with respect to any external computers that may be requesting that data be processed. Exemplary processing computers may include a transport computer, a network computer, and an authorizing entity computer.

FIG. 1 shows a block diagram of a system 100 comprising a number of components according to an embodiment of the invention. The system 100 comprises an authentication node 102, an enrollment node 104, a plurality of worker nodes 106 including a first worker node 106A, a second worker node 106B, and an Nth worker node 106C, as well as a resource provider computer 108, a transport computer 110, a network computer 112, and an authorizing entity computer 114.

The plurality of worker nodes 106 may be in operative communication with the enrollment node 104 and the authentication node 102. The enrollment node 104 may be in operative communication with the authentication node 102 and the plurality of worker nodes 106 including the first worker node 106A, the second worker node 106B, and the Nth worker node 106C. Further, the authentication node 102 may be in operative communication with the resource provider computer 108. The resource provider computer 108 may be in operative communication with the transport computer 110 which may be in operative communication with the network computer 112. The network computer 112 may be in operative communication with the authorizing entity computer 114.

For simplicity of illustration, a certain number of components are shown in FIG. 1. It is understood, however, that embodiments of the invention may include more than one of each component. For example, there may be many worker nodes. In one example, there may be five worker nodes, in another, there may be fifty worker nodes.

The components in system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The authentication node 102 may be configured to authenticate biometric templates. In some embodiments, the authentication node 102 may be operated by a user. For example, the authentication node 102 may be a smart phone operated by the user, wherein the user initiates an interaction that requires the user to authenticate their identity. In some embodiments, the authentication node 102 may be in operative communication with the resource provider computer 108, the enrollment node 104, and the plurality of worker nodes 106.

The enrollment node 104 may be configured to enroll biometric templates. In some embodiments, the enrollment node 104 may be operated by the user. For example, the enrollment node 104 may be a laptop computer operated by the user, wherein the user initiates enrollment of a biometric template.

In some embodiments, the enrollment node 104 and the authentication node 102 may be the same node. For example, the user may enroll a first biometric template using a personal computer and then, later, authenticate a second biometric template using the personal computer. In this way, the personal computer may be the enrollment node 104 during enrollment and may be the authentication node 102 during authentication.

The first worker node 106A, the second worker node 106B, and the Nth worker node 106C of the plurality of worker nodes 106 may be configured to compare encrypted biometric template parts. In some embodiments, the second worker node 106B and the Nth worker node 106C may have similar characteristics to the first worker node 106A.

In other embodiments, the first worker node 106A may have previously been an enrollment node 104 or an authentication node 102. For example, the user may enroll a first biometric using a personal computer, and then authenticate a second biometric template using a smart watch as the authentication node 102. In this case, the laptop computer may be first used as the enrollment node 104, but then may be used as the first worker node 106A during authentication. In some embodiments, each worker node of the plurality of worker nodes 106 may be in operative communication with one another.

The resource provider computer 108 may be operated by an entity such as a merchant. In some embodiments, the resource provider computer 108 may be a server computer.

The resource provider computer 108 may be in operative communication with the authentication node 102 and the transport computer 110. In some embodiments, the resource provider computer 108 may host a resource provider host site that allows users to conduct interactions.

In some embodiments, the resource provider host site may be a Website. The authentication node 102 may be capable of communicating with the resource provider host site and/or the resource provider computer 108.

In other embodiments, the resource provider of the resource provider computer 108 may create a resource provider application and may provide the resource provider application to the authentication node 102. The resource provider application may allow the user to initiate an interaction with the resource provider computer 108 via the resource provider application.

The transport computer 110 may be located between (in an operational sense) the resource provider computer 108 and the network computer 112. The transport computer 110 may be operated by an entity such as an acquirer. An acquirer can maintain an account of any merchants with which users may wish to interact. In some embodiments, the transport computer 110 may be a server computer.

The network computer 112 may route or switch messages between a number of transport computers including the transport computer 110, and a number of authorizing entity computers including the authorizing entity computer 114. The network computer may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from the transport computer 110 to the authorizing entity computer 114 via a communication channel. The processing network computer may further forward an authorization response message received from the authorizing entity computer 114 to the transport computer 110.

The authorizing entity computer 114 may be configured to authorize any suitable request, including access to data, access to a location, or approval for a payment. In some embodiments, the authorizing entity computer 114 may be operated by an account issuer. Typically, the issuer is an entity (e.g., a bank) that issues and maintains an account of a user. The account may be a credit, debit, prepaid, or any other type of account.

Figure 2:
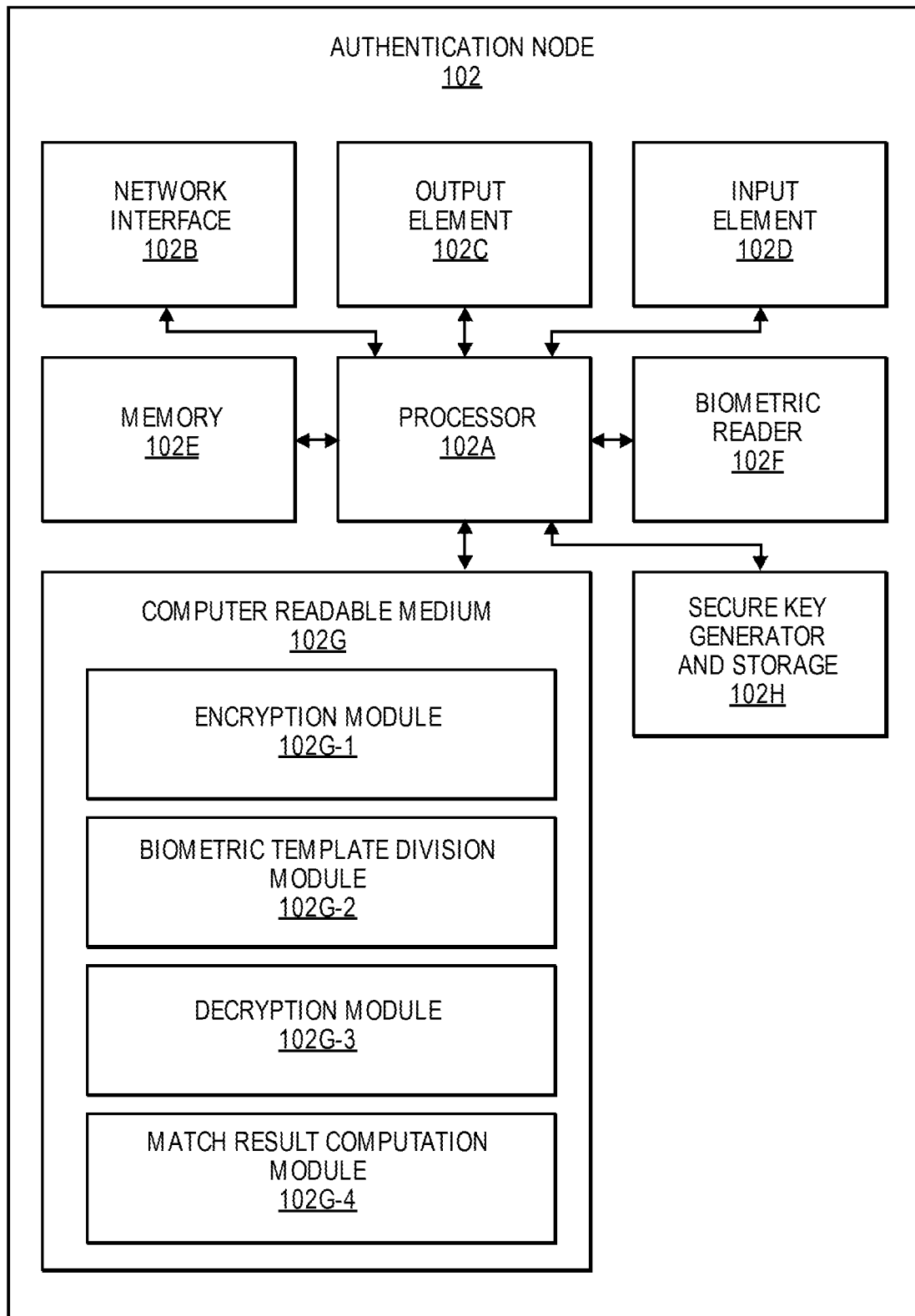
FIG. 2 shows a block diagram of an authentication node according to an embodiment of the invention.

FIG. 2 shows a block diagram of an authentication node 102 according to an embodiment of the invention. The authentication node 102 may comprise a processor 102A, a network interface 102B, an output element 102C, an input element 102D, a memory 102E, a biometric reader 102F, and a computer readable medium 102G comprising an encryption module 102G-1, a biometric template division module 102G-2, a decryption module 102G-3, and a match result computation module 102G-4, as well as a secure key generator and storage 102H.

The processor 102A may be operatively coupled to the network interface 102B, the output element 102C, the input element 102D, the memory 102E, the biometric reader 102F, the computer readable medium 102G, and the secure key generator and storage 102H.

The network interface 102B may include an interface that can allow the authentication node 102 to communicate with external computers or other nodes. For example, the network interface 102B may comprise a contact, Bluetooth, or Wi-Fi interface. In some embodiments, the network interface 102B may be configured to allow secure transmissions between the authentication node 102 and the enrollment node 104 as well as the plurality of worker nodes 106.

The output element 102C may comprise any suitable devices that may output data. Examples of the output element 102C may include display screens, speakers, and data transmission devices.

The input element 102D may include any suitable device capable of inputting data into the authentication node 102. Examples of the input element 102D may include buttons, touchscreens, touch pads, microphones, biometric scanners, etc.

The memory 102E may be coupled to the processor 102A and may store data, applications, keys, and any other suitable information. The memory 102E may be in the form of one or more memory devices (e.g., RAM, EEPROM, ROM chips), using any suitable mode of data storage. In some embodiments, the memory 102E in the authentication node 102 may also include a secure storage area for storing sensitive data. For example, the memory 102E may be part of or may contain a secure element.

The computer readable medium 102G may comprise code, executable by the processor 102A. The computer readable medium 102G may contain any number of applications, modules, and code. The computer readable medium 102G may comprise a number of modules such as the encryption module 102G-1, the biometric template division module 102G-2, the decryption module 102G-3, and the match result computation module 102G-4. The computer readable medium 102G may comprise code, executable by the processor 102A for implementing a method comprising: receiving a plurality of encrypted match values, wherein the plurality of encrypted match values were formed by a plurality of worker nodes that compare a plurality of encrypted second biometric template parts derived from a second biometric template to a plurality of encrypted first biometric template parts derived from a first biometric template; decrypting the plurality of encrypted match values resulting in a plurality of decrypted match values; and determining if a first biometric template matches the second biometric template using the plurality of decrypted match values.

The encryption module 102G-1 may be capable of encrypting a second biometric template. For example, the encryption module 102G-1 may access the secure key generator and storage 102H to obtain an authentication node public key. The encryption module 102G-1 may use the authentication node public key to encrypt the second biometric template.

In other embodiments, the encryption module 102G-1 may be capable of encrypting a plurality of second biometric template parts. The encryption module 102G-1 may encrypt each second biometric template part of the plurality of second biometric template parts separately. For example, if there are three second biometric template parts, the encryption module 102G-1 may encrypt a first part, a second part, and a third part. The encryption module 102G-1 may use any of the described methods of encryption to encrypt the second biometric template parts, for example, encrypting with the authentication node public key. Other methods of encrypting may be through the use of secure multi-party computation. Secure multi-party computation may include techniques such as Yao based protocols, oblivious transfer, etc. The use of garbled circuits are explained by "*How to generate and exchange secrets,*" Foundations of Computer Science, 1986., 27*th Annual Symposium on. IEEE:* 162-167 which is hereby incorporated by reference.

The biometric template division module 102G-2 may be capable of dividing the second biometric template resulting in a plurality of second biometric template parts. The second biometric template may be divided into any suitable number of parts.

In some embodiments, the second biometric template may be divided into parts based on a fixed policy. For example, a fixed policy may state that if the second biometric template represents the user's face, then the second biometric template may be divided into second biometric template parts relating to facial regions such as eye, nose, mouth, etc. In some embodiments, the fixed policy may be predetermined by an entity. The fixed policy may determine how the second biometric template is divided into parts, based on the type of biometric template (i.e., face, fingerprint, retina, etc.), the number of available worker nodes, a location of the enrollment node 104, network connectivity, etc.

In some embodiments, the biometric template division module 102G-2 may determine the fixed policy that was used to divide a first biometric template. The second biometric template may be divided in a same or similar way to the first biometric template. In some embodiments, the same fixed policy may be used. In other embodiments, the fixed policy may be stored in the memory 102E.

In some embodiments, the biometric template division module 102G-2 may divide the second biometric template by splitting the second biometric template into a number of consecutive equally sized parts. For example, if the second biometric template is a face template that is represented by a two-dimensional array, then the two-dimensional array may be divided into 4 equally sized quadrants, resulting in four second biometric templates. In another example, the face template may be a one-dimensional array, wherein the one-dimensional array may be divided into four parts including a first fourth, a second fourth, a third fourth, and a last fourth. This may be done, for example, with the face template array of faceTemplateArr [01001110010010000001101001], which may be split into faceTemplatePartOne[0100111], faceTemplatePartTwo [0010100], faceTemplatePartThree[1000000], and faceTemplatePartFour[1101001].

In some embodiments, the biometric template division module 102G-2 may divide the second biometric template through the methods of splitting biometric templates described in U.S. Pat. No. 9,847,997, hereby incorporated by reference.

The decryption module 102G-3 may be capable of decrypting a plurality of encrypted match values resulting in a plurality of decrypted match values. In some embodiments, the encrypted match values may have been encrypted with an authentication node public key. The decryption module 102G-3 may decrypt the encrypted match values with an authentication node private key, wherein the authentication node public key and the authentication node private key form a public/private key pair. In other embodiments, the decryption module 102G-3 may use secure multi-party computation techniques as described above.

For example, the authentication node 102 may receive a plurality of encrypted match values from a plurality of worker nodes 106. The plurality of encrypted match values may include any number of encrypted match values. For example, if there are 5 encrypted match values, then the decryption module 102G-3 may decrypt the 5 encrypted match values sequentially, resulting in 5 decrypted match values.

The match result computation module 102G-4 may be capable of determining if a first biometric template matches a second biometric template using a plurality of decrypted match values.

In some embodiments, determining if the first biometric template matches a second biometric template using a plurality of decrypted match values may further comprise determining, by the match result computation module 102G-4 a weight associated with each decrypted match value of the plurality of decrypted match values. In some embodiments, the match result computation module 102G-4 may determine an overall authentication threshold. The match result computation module 102G-4 may compare a number of worker nodes that responded to a number of needed responses. The match result computation module 102G-4 may determine if an overall decision based on the weights and the decrypted match values is greater than or equal to the overall authentication threshold. The determination of whether the first biometric template matches the second biometric template is described in more detail below.

The biometric reader 102F may include a device for capturing data from an individual's biometric sample. Examples of biometric readers may include fingerprint readers, front-facing cameras, microphones, and iris scanners.

The secure key generator and storage 102H may be secure database that securely stores cryptographic keys as well as generates public/private key pairs. For example, the secure key generator and storage 102H may generate an authentication node public key and an authentication node private key. The secure key generator and storage 102H may securely store the authentication node public key and the authentication node private key. In some embodiments, the authentication node public key may be shared with other devices, such as the enrollment node 104.

Figure 3:
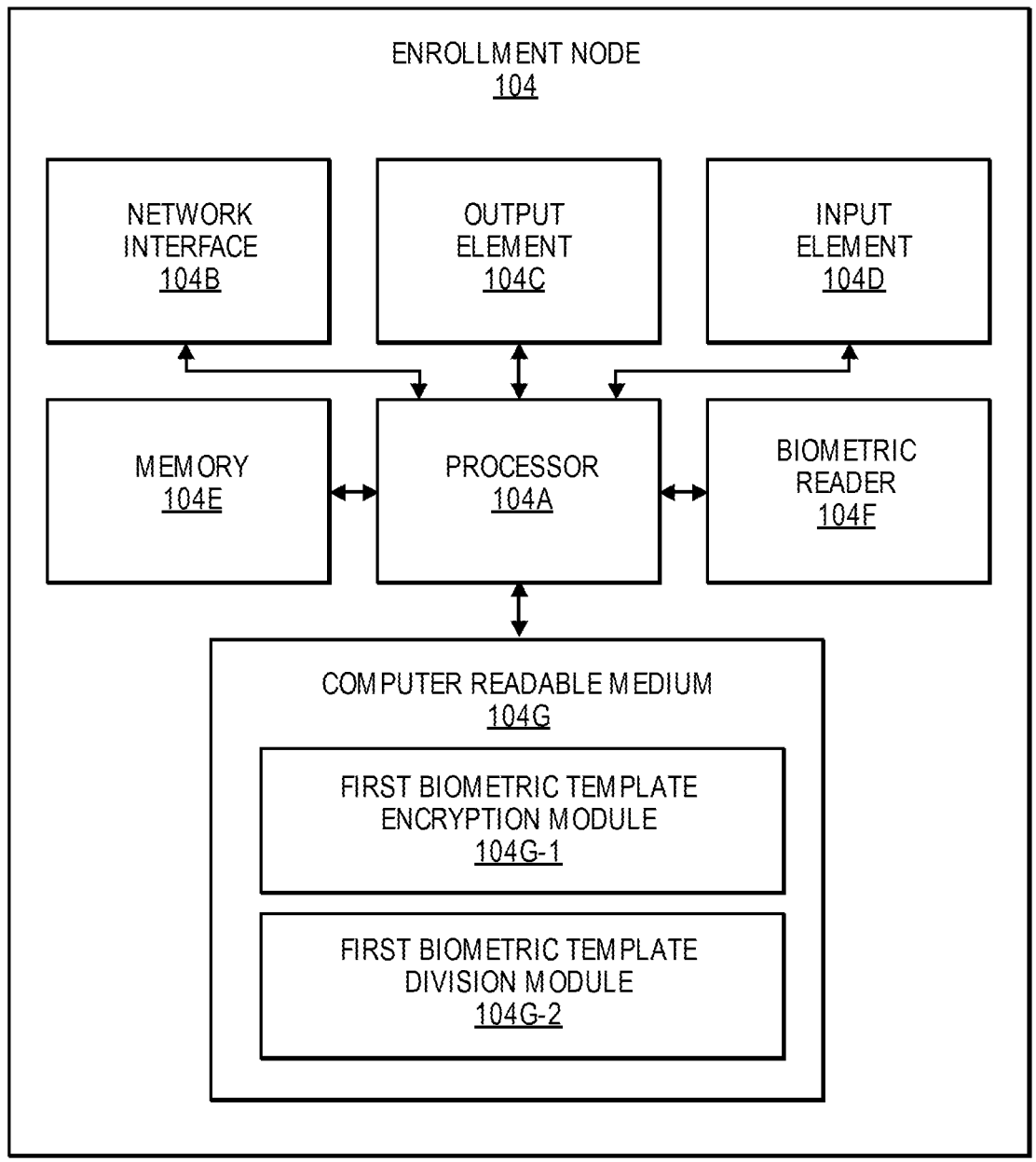
FIG. 3 shows a block diagram of an enrollment node according to an embodiment of the invention.

FIG. 3 shows a block diagram of an enrollment node 104 according to an embodiment of the invention. The enrollment node 104 may comprise a processor 104A, a network interface 104B, an output element 104C, an input element 104D, a memory 104E, a biometric reader 104F, and a computer readable medium 104G comprising a first biometric template encryption module 104G-1 and a first biometric template division module 104G-2.

The network interface 104B may have similar characteristics to the network interface 102B. In some embodiments, the network interface 104B may be configured to allow secure transmissions between the enrollment node 104 and the authentication node 102 as well as the plurality of worker nodes 106.

The output element 104C may have similar characteristics to the output element 102C. The input element 104D may have similar characteristics to the input element 104D. The memory 104E may be coupled to the processor 104A. The memory 104E may have similar characteristics to the memory 102E.

The computer readable medium 104G may comprise code, executable by the processor 104A. The computer readable medium 104G may contain any number of applications, modules, and code. The computer readable medium 104G may comprise a number of modules, such as a first biometric template encryption module 104G-1 and a first biometric template division module 104G-2.

The first biometric template encryption module 104G-1 may be capable of encrypting a first biometric template. In some embodiments, the first biometric template encryption module 104G-1 may be capable of encrypting the first biometric template using an authentication node public key. In other embodiments, the first biometric template encryption module 104G-1 may be capable of encrypting the first biometric template using secure multi-party computation techniques as described above.

In other embodiments, the first biometric template encryption module 104G-1 may be capable of encrypting a plurality of first biometric template parts. For example, the plurality of first biometric template parts may include 3 first biometric template parts, i.e., first biometric template part one, first biometric template part two, and first biometric template part three. The first biometric template encryption module 104G-1 may encrypt the first biometric template part one, the encrypt the first biometric template part two, and then encrypt the first biometric template part three. The first biometric template encryption module 104G-1 may be capable of encrypting any number of first biometric template parts.

The first biometric template division module 104G-2 may be capable of dividing a first biometric template resulting in first biometric template parts. The first biometric template division module 104G-2 may divide the first biometric template using the techniques described above for the biometric template division module 102G-2. In some embodiments, the first biometric template division module 104G-2 may be capable of dividing an encrypted first biometric template.

The biometric reader 104F may have similar characteristics to the biometric reader 102F.

Figure 4:
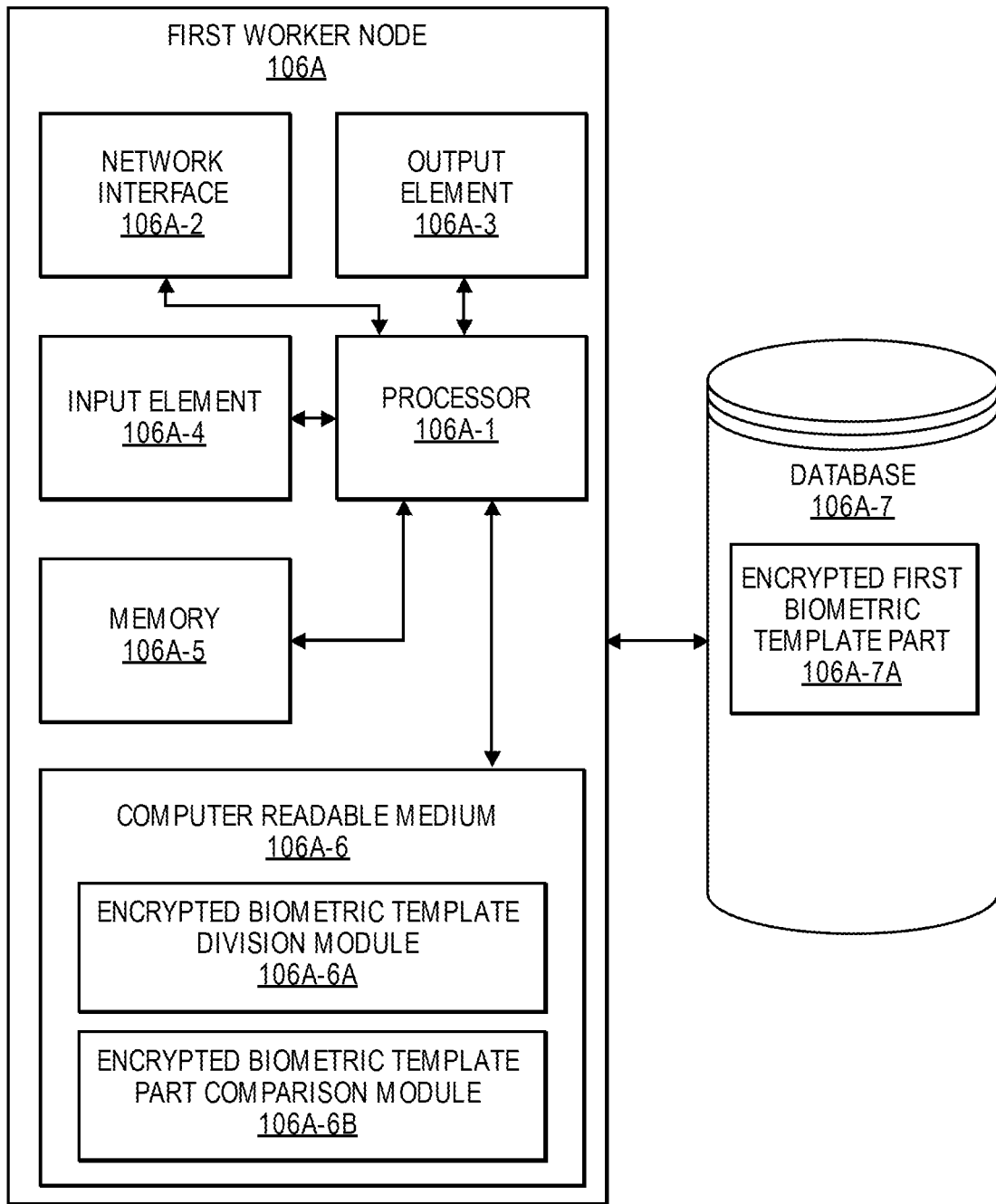
FIG. 4 shows a block diagram of a worker node according to an embodiment of the invention.

FIG. 4 shows a block diagram of a first worker node 106A according to an embodiment of the invention. The first worker node 106A may comprise a processor 106A-1, a network interface 106A-2, an output element 106A-3, an input element 106A-4, a memory 106A-5, and a computer readable medium 106G comprising an encrypted biometric template division module 106A-6A and an encrypted biometric template part comparison module 106A-6B, as well as a database 106A-7 including an encrypted first biometric template part 106A-7A.

The processor 106A-1 may be operatively coupled to the network interface 106A-2, the output element 106A-3, the input element 106A-4, the memory 106A-5, and the computer readable medium 106A-6. The first worker node 106A may be operatively coupled to the database 106A-7.

The network interface 106A-2 may have similar characteristics to the network interface 102B. In some embodiments, the network interface 106A-2 may be configured to allow secure transmissions between the worker node 106 and the authentication node 102 as well as the enrollment node 104.

The output element 106A-3 may have similar characteristics to the output element 102C. The input element 106A-4 may have similar characteristics to the input element 102D. The memory 106A-5 may be coupled to the processor 106A-1. The memory 106A-5 may have similar characteristics to the memory 102E.

The computer readable medium 106A-6 may comprise code, executable by the processor 106A-1. The computer readable medium 106A-6 may contain any number of applications, modules, and code. The computer readable medium 106A-6 may comprise a number of modules, such as the encrypted biometric template division module 106A-6A and the encrypted biometric template part comparison module 106A-6B. The computer readable medium 106A-6 may comprise code, executable by the processor for implementing a method comprising: storing an encrypted first biometric template part; comparing the encrypted first biometric template part and an encrypted second biometric template part resulting in an encrypted match value; and transmitting the encrypted match value to an authentication node.

The encrypted biometric template division module 106A-6A may be capable of dividing encrypted biometric templates resulting in a plurality of encrypted biometric template parts. In some embodiments, the encrypted biometric template division module 106A-6A may divide the encrypted biometric template based on the fixed policy. For example, the fixed policy may state that the encrypted biometric template division module 106A-6A may split the encrypted biometric template into thirds and keep the middle third for storage.

In other embodiments, the encrypted biometric template division module 106A-6A may divide the encrypted biometric template into any suitable number of encrypted biometric templates. For example, if the encrypted biometric template is encBioTemp[f156p69w2bcv6751k613mb8u], then the encrypted biometric template division module 106A-6A may split encBioTemp into three parts of encBioTempPartOne[f156p69w], encBioTempPartTwo [2bcv6751], and encBioTempPartThree[k613mb8u]. In some embodiments, the first worker node 106A may store one of the encrypted biometric template parts. In other embodiments, the encrypted biometric template parts may not be equally sized.

The biometric template comparison module 106A-6B may be capable of comparing the encrypted first biometric template part 106A-7A to an encrypted second biometric template part. The encrypted biometric template part comparison module 106A-6B may be capable of comparing two encrypted template parts through the use of homomorphic secret sharing. Homomorphic secret sharing may be a type of sharing algorithm in which the secret is encrypted using homomorphic encryption. Homomorphic encryption may be a form of encryption that allows computation on ciphertexts, and generates an encrypted result which, when decrypted, matches the result of the computations as if they had been performed on the plaintext. Homomorphic encryption may be described in more detail in Armknecht, Frederik, et al. "A Guide to Fully Homomorphic Encryption." *IACR Cryptology ePrint Archive* 2015 (2015): 1192, hereby incorporated by reference.

The database 106A-7 may be a conventional, fault tolerant, relational, scalable, secure database such as those commercially available from Oracle™ or Sybase™. The database 106A-7 may store the encrypted first biometric template part 106A-7A. In some embodiments, the database 106A-7 may store any suitable number of encrypted first biometric template parts.

ENROLLMENT

Figure 5:
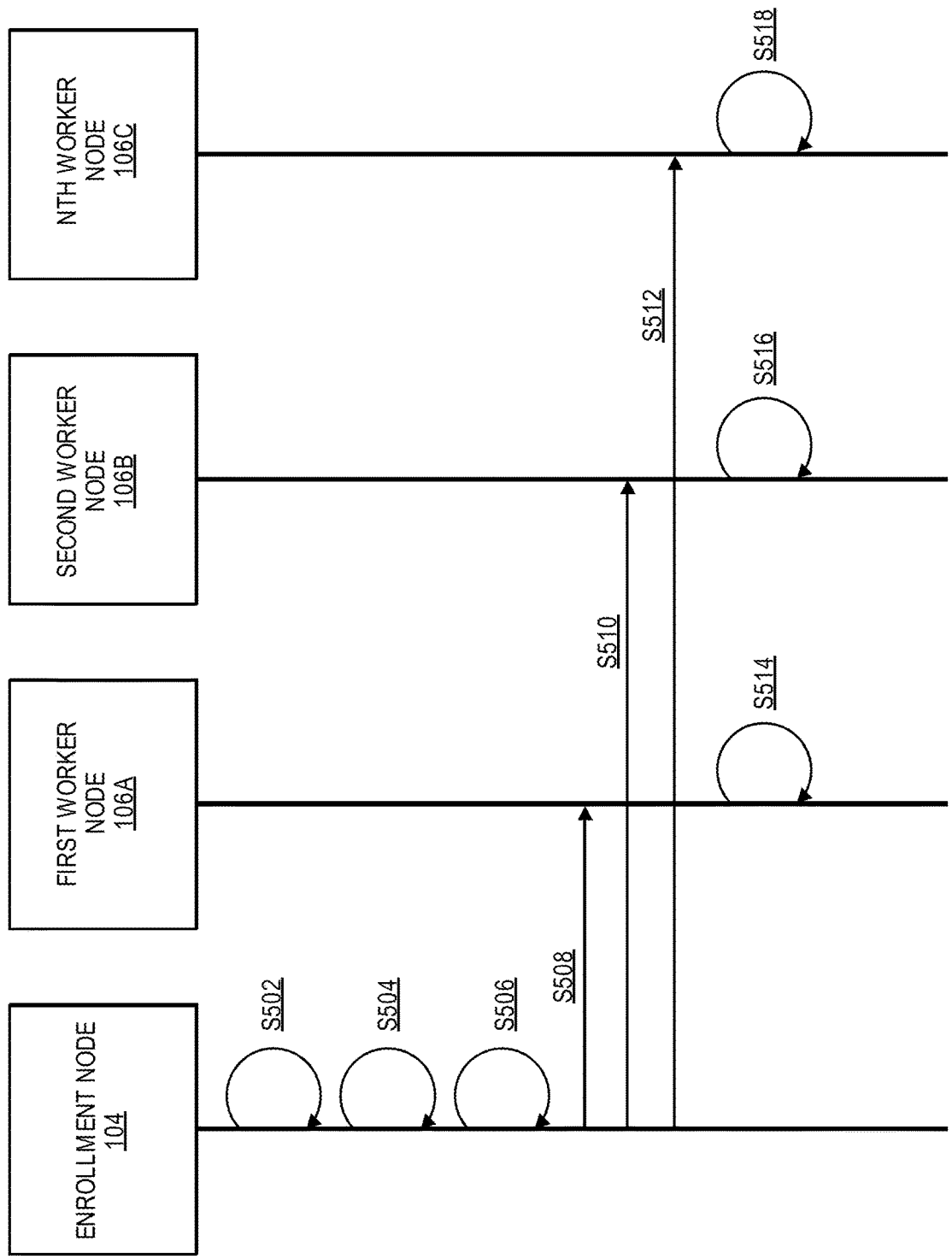
FIG. 5 shows a flow diagram illustrating a method of enrolling a biometric template.

FIG. 5 shows a flow diagram illustrating a method of enrolling a biometric template according to an embodiment of the invention. The method illustrated in FIG. 5 will be described in the context of a user operating nodes owned by the user. It is understood, however, that the invention can be applied to other circumstances (e.g., nodes at various locations, with devices owned by various entities, etc.) in which the ability to enroll and authenticate are needed. Although the steps are illustrated in a specific order, it is understood that embodiments of the invention may include methods that have the steps in different orders. In addition, steps may be omitted or added and may still be within embodiments of the invention.

Step S502 may occur when the user of the enrollment node 104 initiates the enrollment of a first biometric template. In some embodiments, the user may be prompted to enter a biometric sample. The user may input the first biometric sample using the biometric reader 104H of the enrollment node 104. For example, the user may be prompted to take a photograph of the user's face using a camera on the user's mobile phone.

At step S502, the enrollment node 104 may generate a first biometric template from the first biometric sample. In some embodiments, features of the first biometric sample may be extracted and used to generate the first biometric template. Features may be characteristics or unique aspects of a biometric sample. For example, a biometric sample of a fingerprint may include features of the ridges, groves, and directions of the lines on the finger. There may be many ways to extract the features of the first biometric sample in order to generate the first biometric template. For example, three different methods may be minutiae based techniques, correlation based techniques, and pattern based techniques.

At step S504, the enrollment node 104 may divide the first biometric template into a plurality of first biometric template parts. In some embodiments, the first biometric template may be divided into parts based on a fixed policy. For example, a fixed policy may state that if the first biometric template represents the user's face, then the first biometric template may be divided into first biometric template parts relating to facial regions such as eye, nose, mouth, etc. In some embodiments, a biometric template may be divided by any of the methods described above.

In some embodiments, the fixed policy may be predetermined by an entity before enrollment. The fixed policy may determine how the first biometric template is divided into parts, based on the type of biometric template (i.e., face, fingerprint, retina, etc.), the number of available worker nodes, a location of the enrollment node 104, network connectivity, etc. For example, the enrollment node 104 may determine, using the fixed policy, to divide the first biometric template into five parts if five worker nodes are available.

At step S506, after dividing the first biometric template into a plurality of first biometric template parts, the enrollment node 104 may encrypt the plurality of first biometric template parts resulting in a plurality of encrypted first biometric template parts. In some embodiments, the plurality of first biometric template parts may be encrypted with an authentication node public key. In other embodiments, the plurality of first biometric template parts may be encrypted using secure multi-party computation techniques, wherein the parties involved may be the enrollment node 104, the authentication node 102, and the plurality of worker nodes 106. The secure multi-party computation techniques may involve any of the previously mentioned secure multi-party computation techniques.

Next, the enrollment node 104 may respectively transmit the plurality of encrypted first biometric template parts to the plurality of worker nodes 106.

At step S508, the enrollment node 104 may transmit an encrypted first biometric template part to the first worker node 106A. At step S510, the enrollment node 104 may transmit an encrypted first biometric template part to the second worker node 106B. At step S512, the enrollment node 104 may transmit an encrypted first biometric template part to the Nth worker node 106C.

For example, if the plurality of encrypted first biometric template parts includes an encrypted eye template part, an encrypted nose template part, and an encrypted mouth template part, then each different encrypted template part may be sent to a different worker node. The encrypted eye template part may be transmitted to the first worker node 106A (the user's personal computer), the encrypted nose template part may be transmitted to the second worker node 106B (the user's smart watch), and the encrypted mouth template part may be transmitted to the Nth worker node 106C (the user's home assistant device). There may be any number of worker nodes capable of receiving an encrypted first biometric template part from the enrollment node 104.

In some embodiments, the worker nodes of the plurality of worker nodes 106 may be pre-registered with the enrollment node 104. The user may select to connect the enrollment node 104 with a worker node. For example, the user may be presented with a list of available devices, available via Bluetooth connection, wherein the user may select a device on the list of available devices.

In other embodiments, there may be a known worker node table stored in the memory 104E of the enrollment node 104. The known worker node table may include a list of worker nodes that the enrollment node 104 has previously connected to. In some embodiments, the user of the enrollment node 104 may add a worker node to the known worker node table. In some embodiments, the known worker node table may include the type of connection with the worker node (i.e., Wi-Fi, Bluetooth, etc.) and may include a device identifier of the worker node.

In some embodiments, the enrollment node 104 may transmit a connection request message to the first worker node 106A. After receiving the connection request message, the first worker node 106A may generate and transmit a connection response message to the enrollment node 104. The enrollment node 104 may determine if a connection response message has been received from the first worker node 106A. In some embodiments, if the enrollment node 104 receives the connection response message, then the enrollment node 104 may determine that the first worker node 106A is active, or otherwise online. In other embodiments, if the enrollment node 104 does not receive the connection response message, then the enrollment node 104 may determine that the first worker node 106A is not active, or otherwise offline. After determining that the first worker node 106A is active, the enrollment node 104 may transmit the encrypted first biometric template part to the first worker node 106A.

In some embodiments, the enrollment node 104 may randomly assign the plurality of encrypted first biometric template parts to the plurality of worker nodes 106 and then respectively transmit the plurality of encrypted first biometric template parts to the assigned worker nodes 106. For example, the encrypted mouth template part may not always be transmitted to the user's home assistant device.

After respectively receiving the plurality of encrypted first biometric template parts, the plurality of worker nodes 106 may respectively store the plurality of encrypted first biometric template parts in a plurality of worker nodes 106.

At step S514, the first worker node 106A may store the encrypted first biometric template part into the database 106A-7. At step S516, the second worker node 106B may store the encrypted first biometric template part into a database. At step S518, the Nth worker node 106C may store the encrypted first biometric template part into a database.

Each worker node of the plurality of worker nodes 106 may store a different encrypted first biometric template part of the plurality of encrypted first biometric template parts.

In some embodiments, the plurality of encrypted first biometric template parts may be transmitted between worker nodes 106 securely to further improve security. The plurality of encrypted first biometric template parts may be transmitted between worker nodes 106 on a schedule (e.g., once every day) or randomly. For example, the first worker node may transmit the encrypted eye template to the second worker node, the second worker node may transmit the encrypted nose template to the third worker node, and the third worker node may transmit the encrypted mouth template to the first worker node. The respective destination (worker node) of the plurality of encrypted first biometric template parts may be determined by a pattern or randomly.

In other embodiments, the enrollment node 104 may store at least one encrypted first biometric template part of the plurality of encrypted first biometric template parts. The enrollment node 104 may then later be used as a worker node of the plurality of worker nodes 106.

Figure 6:
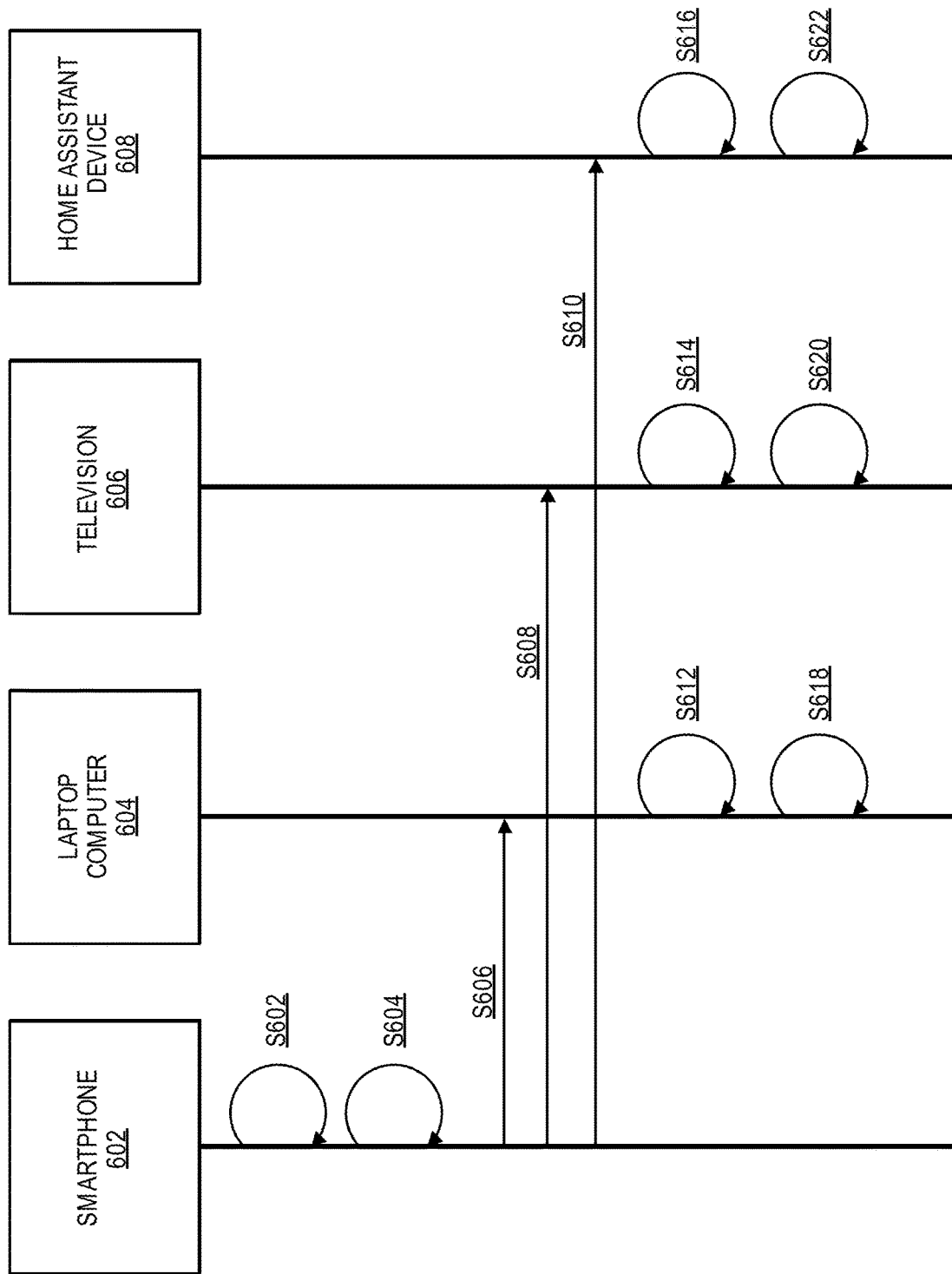
FIG. 6 shows a flow diagram illustrating an alternate method of enrolling a biometric template.

FIG. 6 shows a flow diagram illustrating an alternate method of enrolling a biometric template according to an embodiment of the invention. FIG. 6 includes a smartphone 602 that may be the enrollment node 104, a laptop computer 604 that may be the first worker node 106A, a television 606 that may be the second worker node 106B, and a home assistant device 608 that may be the Nth worker node 106C. It is understood that the enrollment node 104, the first worker node 106A, the second worker node 106B, and the Nth worker node 106C may be other devices and are not limited to a smartphone, a laptop computer, a television, and a home assistant device. Although the steps are illustrated in a specific order, it is understood that embodiments of the invention may include methods that have the steps in different orders. In addition, steps may be omitted or added and may still be within embodiments of the invention.

Step S602 may occur when the user of the smartphone 602 initiates the enrollment of a biometric template. In some embodiments, the user may be prompted to enter a first biometric sample. The user may input the first biometric sample using a biometric reader of the smartphone 602. For example, the user may be prompted to scan the user's fingerprint using a fingerprint scanner on the user's smartphone 602.

At step S602, the smartphone 602 may generate a first biometric template from the first biometric sample. The generation of the first biometric template from the first biometric sample may be done in the previously described ways.

At step S604, the smartphone 602 may encrypt the first biometric template resulting in an encrypted first biometric template. In some embodiments, the first biometric template may be encrypted with an authentication node public key. In other embodiments, the first biometric template may be encrypted using secure multi-party computation techniques. Encrypting the first biometric template may be performed in similar ways to the previously described encrypting of the plurality of first biometric template parts.

At step S606, the smartphone 602 may transmit the encrypted first biometric template to laptop computer 604. At step S608, the smartphone 602 may transmit the encrypted first biometric template to the television 606. At step S610, the smartphone 602 may transmit the encrypted first biometric template to the home assistant device 608.

In some embodiments, the smartphone 602 may be connected to the plurality of worker nodes 106, including the laptop computer 604, the television 606, and the home assistant device 608, by any suitable means. For example, the user may have previously connected the smartphone 602 to the laptop computer 604 via a Bluetooth connection. The connection may be stored in a table of known worker nodes in the memory of the smartphone 602.

After receiving the encrypted first biometric template, the plurality of worker nodes 106 may divide the encrypted first biometric template into a plurality of encrypted first biometric template parts.

At step S612, the laptop computer 604 may divide the encrypted first biometric template into a plurality of encrypted first biometric template parts. At step S614, the television 606 may divide the encrypted first biometric template into a plurality of encrypted first biometric template parts. At step S616, the home assistant device 608 may divide the encrypted first biometric template into a plurality of encrypted first biometric template parts.

In some embodiments, each of the plurality of worker nodes 106 may divide the encrypted first biometric template into the plurality of encrypted first biometric template parts using a method known to that worker node 106 or a fixed policy. In some embodiments, the encrypted first biometric template may be divided differently at each worker node 106 of the plurality of worker nodes 106.

For example, the fixed policy of the worker node 106 may be to divide the encrypted first biometric template into a number of parts. The encrypted first biometric template may be divided into three parts, a first third, a second third, and a last third. The encrypted first biometric template may be divided into any number of parts. The worker node 106 may determine to use one of, or some of, the plurality of encrypted first biometric template parts during authentication. In some embodiments, the fixed policy may include any of the previously mentioned methods for dividing an encrypted biometric template.

The plurality of worker nodes 106 may respectively store the plurality of encrypted first biometric template parts in a memory or database.

At step S618, the laptop computer 604 may store the encrypted first biometric template into a database. At step S620, the television 606 may store the encrypted first biometric template into a database. At step S622, the home assistant device 608 may store the encrypted first biometric template into a database.

In some embodiments, a worker node of the plurality of worker nodes 106 may store any number of the encrypted first biometric template parts of the plurality of encrypted first biometric template parts.

In some embodiments, the plurality of encrypted first biometric template parts may be transmitted between worker nodes 106 securely to further improve security. The plurality of encrypted first biometric template parts may be transmitted between worker nodes 106 on a schedule (e.g., once every day) or randomly.

In some embodiments, a heartbeat message may be utilized. The heartbeat message may be a message sent from the worker node to the enrollment node 104 or the authentication node 102 that enables the destination to identify if and when the worker node fails or is no longer available. For example, the plurality of worker nodes 106 may transmit a heartbeat message to the enrollment node 104 on a predetermined schedule (i.e., once every 10 minutes, once every hour, etc.). If the enrollment node 104 does not receive the respective heartbeat message during an anticipated arrival period, the enrollment node 104 may determine that the respective worker node may have failed, shutdown, or may generally be unavailable. In some embodiments, the enrollment node 104 may transmit the encrypted first biometric template to the plurality of worker nodes 106 from which the enrollment node 104 has received heartbeat messages from.

AUTHENTICATION

Figure 7:
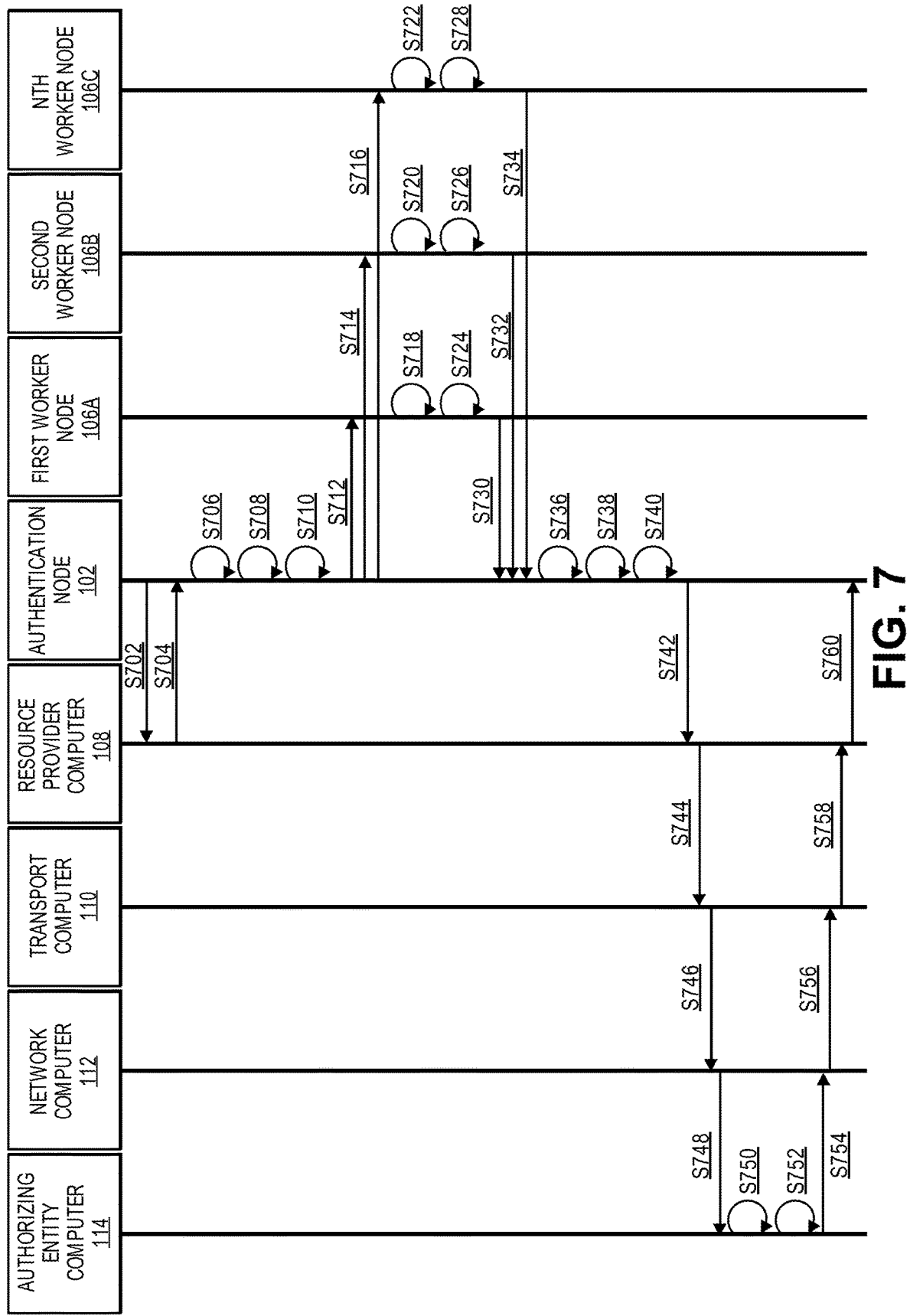
FIG. 7 shows a flow diagram illustrating a method of authenticating a biometric template.

FIG. 7 shows a flow diagram of an authentication method according to an embodiment of the invention. The method illustrated in FIG. 7 will be described in the context of a user initiating a transaction with a merchant via the merchant's Website. It is understood, however, that the invention can be applied to other circumstances (e.g., requesting access to a building, a data access transaction, etc.) in which the ability to authenticate is needed. Although the steps are illustrated in a specific order, it is understood that embodiments of the invention may include methods that have the steps in different orders. In addition, steps may be omitted or added and may still be within embodiments of the invention.

Step S702 may occur when the user of the authentication node 102 initiates an interaction with the resource provider computer 108 or the resource provider host site. In some embodiments, the interaction may be a transaction. For example, the user may select items for purchase on the resource provider host site.

At step S702, the authentication node 102 may transmit an interaction request message to the resource provider computer 108. The interaction request message may include an item the user wants to purchase. In some embodiments, the interaction request message may include a request to initiate an interaction. In other embodiments, the interaction request message may be a transaction request message and may include a request to initiate a transaction.

At step S704, the resource provider computer 108 may transmit an authentication request message to the authentication node 102. The authentication request message may include a request for access data. In some embodiments, the authentication request message may include a request for the user to authenticate themselves.

For example, the resource provider computer 108 may transmit the authentication request message including a request for payment credentials. The user may be able to provide payment credentials that are stored on the authentication node 102 by authenticating the user's identity. For example, the payment credentials may be stored in a secure storage. The payment credentials may be accessed after authentication.

At step S706, after receiving the authentication request message, the authentication node 102 may prompt the user to authenticate. In some embodiments, the authentication node 102 may prompt the user to enter a second biometric sample. The user may input the second biometric sample using the biometric reader 102F of the authentication node 102. For example, the user may initiate the interaction using an application on the user's smart watch, wherein the user may be prompted to input the second biometric sample for authentication. The user may then scan a fingerprint using a fingerprint scanner on the user's smart watch.

In some embodiments, the user may have previously enrolled the first biometric template. The second biometric sample may relate to the first biometric sample. For example, if the first biometric sample represents the user's fingerprint, then the user may be prompted to input the second biometric sample that may also represent the user's fingerprint.

In some embodiments, the user may have previously enrolled multiple biometric templates. For example, the user may have enrolled a forefinger template, a ring finger template, and a facial template. The authentication node 102 may prompt the user to enter any biometric sample relating to biometric templates previously enrolled.

At step S708, the authentication node 102 may generate a second biometric template from the second biometric sample. The generation of the second biometric template from the second biometric sample may similar to the generation of the first biometric template from the first biometric sample.

At step S710, the authentication node 102 may encrypt the second biometric template resulting in an encrypted second biometric template. In some embodiments, the second biometric template may be encrypted with an authentication node public key. In other embodiments, the second biometric template may be encrypted using secure multi-party computation techniques. In some embodiments, the second biometric template may be encrypted with the same key as the first biometric template. The authentication node 102 may encrypt the second biometric template using any of the previously discussed methods.

At step S712, the authentication node 102 may transmit the encrypted second biometric template to the first worker node 106A. At step S714, the authentication node 102 may transmit the encrypted second biometric template to the second worker node 106B. At step S716, the authentication node 102 may transmit the encrypted second biometric template to the Nth worker node 106C.

In some embodiments, there may be a known worker node table stored in the memory 104E of the authentication node 102. The known worker node table may include a list of worker nodes that the authentication node 102 has previously connected to. In some embodiments, the user of the authentication node 102 may add a worker node to the known worker node table. In some embodiments, the known worker node table may include the type of connection with the worker node (i.e., Wi-Fi, Bluetooth, etc.) and may include a device identifier of the worker node.

At step S714, after receiving the encrypted second biometric template, the plurality of worker nodes 106 may respectively divide the encrypted second biometric template into a plurality of encrypted second biometric template parts. In some embodiments, each of the plurality of worker nodes 106 may divide the encrypted second biometric template, using a method known to that worker node 106 or a fixed policy. In some embodiments, the plurality of worker nodes may derive their individual encrypted second biometric template parts. The individual encrypted second biometric template parts may be derived from the encrypted second biometric template.

At step S718, the first worker node 106A may divide the encrypted second biometric template into the plurality of encrypted second biometric template parts. At step S720, the second worker node 106B may divide the encrypted second biometric template into the plurality of encrypted second biometric template parts. At step S722, the Nth worker node 106C may divide the encrypted second biometric template into the plurality of encrypted second biometric template parts.

In some embodiments, the encrypted second biometric template may be divided differently at each worker node of the plurality of worker nodes 106. In other embodiments, the plurality of worker nodes 106 may respectively divide the encrypted second biometric template in the same way as the plurality of worker nodes 106 respectively divided the encrypted first biometric template. In other embodiments, the encrypted second biometric template may be divided in any of the ways previously described.

In some embodiments, after step S708 (generating the second biometric template), the authentication node 102 may divide the second biometric template into a plurality of second biometric template parts. In some embodiments, the second biometric template may be divided into parts based on the fixed policy. In other embodiments, the authentication node 102 may divide the second biometric template into a plurality of second biometric template parts in a same or similar way to how the enrollment node 104 divided the first biometric template into the plurality of first biometric template parts.

In some embodiments, after the authentication node 102 divides the second biometric template into the plurality of second biometric template parts, the authentication node 102 may encrypt the plurality of second biometric template parts resulting in a plurality of encrypted second biometric template parts. In some embodiments, the plurality of second biometric template parts may be encrypted with an authentication node public key. In other embodiments, the plurality of second biometric template parts may be encrypted using secure multi-party computation techniques. The plurality of second biometric template parts may be encrypted in the same way as the plurality of first biometric template parts, step S506.

In some embodiments, after encrypting the plurality of second biometric template parts, the authentication node 102 may transmit the plurality of encrypted second biometric template parts to the plurality of worker nodes 106.

The plurality of worker nodes 106 may then respectively compare the plurality of encrypted second biometric template parts and the plurality of encrypted first biometric template parts resulting in a plurality of encrypted match results.

At step S724, the first worker node 106A may compare the encrypted second biometric template part and the encrypted first biometric template part resulting in an encrypted match value. At step S726, the second worker node 106B may compare the encrypted second biometric template part and the encrypted first biometric template part resulting in an encrypted match value. At step S728, the Nth worker node 106C may compare the encrypted second biometric template part and the encrypted first biometric template part resulting in an encrypted match value.

In some embodiments, the plurality of encrypted second biometric template parts and the plurality of encrypted first biometric template parts may not be decrypted. In other embodiments, they may be compared in an encrypted domain through the use of homomorphic comparison techniques. For example, the worker node 106 may have previously stored an encrypted fingerprint template part and now may have an encrypted second fingerprint template part. The worker node 106 may compare the encrypted fingerprint template part and the encrypted second fingerprint template part.

In some embodiments, the comparison of an encrypted second biometric template part and an encrypted first biometric template part may result in an encrypted match value of the plurality of encrypted match values. The encrypted match value, when decrypted into a decrypted match value, may be in a fixed range (i.e., 1-100). In other embodiments, the encrypted match value, when decrypted into the decrypted match value, may be a decision (i.e., "match," "no match"). The encrypted match value may be based on a threshold of each worker node 106 of the plurality of worker nodes 106. The threshold may be predetermined based on false acceptance rates, false rejection rates, acceptance rates, rejection rates, etc. In some embodiments, each worker node of the plurality of worker nodes 106 may have a different threshold. Some worker nodes may have a more stringent threshold while others are more relaxed.

The comparison of the encrypted second biometric template part and the encrypted first biometric template part may be done through the use of homomorphic comparison as described above.

After comparing the encrypted first biometric template parts to the encrypted second biometric template parts, the plurality of worker nodes 106 may transmit the plurality of encrypted match values to the authentication node 102.

At step S730, the first worker node 106A may transmit the encrypted match value to the authentication node 102. At step S732, the second worker node 106B may transmit the encrypted match value to the authentication node 102. At step S734, the Nth worker node 106C may transmit the encrypted match value to the authentication node 102.

In some embodiments, the authentication node 102 may receive a number of encrypted match values (k') less than or equal to the number of worker nodes (N). For example, there may be ten worker nodes, but worker node five is offline, therefore the authentication node 102 may receive nine encrypted match values rather than ten.

At step S736, after receiving the plurality of encrypted match values, wherein the plurality of encrypted match values were formed by the plurality of worker nodes 106 that compare the plurality of encrypted second biometric template parts derived from the second biometric template to the plurality of encrypted first biometric template parts derived from the first biometric template, the authentication node 102 may decrypt the plurality of encrypted match values, resulting in a plurality of decrypted match values. In some embodiments, an authentication node private key may be used to decrypt the plurality of encrypted match values. In other embodiments, the plurality of encrypted match values may be decrypted using secure multi-party computation techniques.

At step S738, the authentication node 102 may determine if the first biometric template and the second biometric template match using the plurality of decrypted match values. In some embodiments, the authentication node 102 may determine if the first and second biometric templates match based on the following equation:

$m_1 * s_1 + m_2 * s_2 + m_3 * s_3 + \ldots + m_{k'} s_{k'}' >= s$, where k'>=K and s=f(K, k') where $m_1, m_2, \ldots m_{k'}'$ may be weights assigned to the decrypted match value from each worker node, $S_1, S_2, \ldots S_{k'}'$ may be the decrypted match values of the plurality of decrypted match values, s may be the overall authentication threshold, + may be a decision fusion operator, * may be an operator to combine the weight of each node with the associated decrypted match value, k' may be a number of worker nodes that the authentication node 102 received the encrypted match value from, and K may be a number of needed responses.

In some embodiments, a weight may be a value. The weights may be different for each worker node 106. The authentication node 102 may determine the weight associated with each decrypted match value of the plurality of decrypted match values. In some embodiments, the authentication node 102 may determine the weights based on the associated worker node 106. For example, the authentication node 102 may determine a small weight to be associated with the decrypted match value of the associated worker node if the associated worker node does not have an accurate comparison method. The weights may be determined on a relative or on an absolute scale.

$s_1, s_2, \ldots s_{k'}'$ may be the decrypted match values. For example, $S_1$ may be the decrypted match value associated with the first worker node, while $s_3$ may be the decrypted match value associated with the third worker node.

The overall authentication threshold (s) may be a value used to determine if the first biometric template matches the second biometric template. The overall authentication threshold may be the threshold of the authentication node 102. In some embodiments, the authentication node 102 may determine the overall authentication threshold. In other embodiments, the overall authentication threshold may be predetermined. In yet other embodiments, the overall authentication threshold may be the same between different authentication nodes. For example, the overall authentication threshold may be equal to a value of 75 whether the authentication node 102 is the user's personal computer or is the user's smart watch.

The operator to combine the weight of each node with the associated decrypted match value may combine the weights and the decrypted match values in any suitable way. In some embodiments, the operator to combine may perform the multiplication operation. For example, the weights and the decrypted match values may be numerical values, in which case the operator to combine may multiply the weight of each node with the associated decrypted match value. In other embodiments, the operator to combine may be an arithmetic combination of multiplication and addition. In some embodiments, the decrypted match values may be binary or integer values.

The decision fusion operator may combine the weight and decrypted match value of one worker node with the weight and decrypted match value of another worker node. In some embodiments, the decision fusion operator may perform the addition operation. In other embodiments, the decision fusion operator may be an arithmetic combination of multiplication and addition.

For example, there may be four decrypted match values of "1," "1," "1," and "0," where, in this example, a value of 1 indicates a match and a value of 0 does not indicate a match. The four decrypted match values may be associated with the weights of 0.4, 0.1, 0.3, and 0.2, respectively. Applying the equation: $(0.4)*(1)+(0.1)*(1)+(0.3)*(1)+(0.2)*(0) \geq s$. Which is $0.8 \geq s$. If s is less than 0.8 then the authentication node 102 may determine that the first biometric template matches the second biometric template.

The authentication node 102 may determine if k'>=K. The authentication node 102 may compare the number of worker nodes that responded (k') to the number of needed responses (K). For example, the authentication node 102 may require receiving at least K encrypted match values and may receive k' encrypted match values. If the authentication node 102 determines that k'>=K then the authentication node 102 may proceed with determining if the second biometric template matches the first biometric template. If the authentication node 102 determines that k'<K then the authentication node 102 may re-preform the previous steps until a predetermined criteria, such as until k'>=K or until a certain amount of time has passed. For example, the number of needed responses may be six, but the number of worker nodes that responded may be four. In this case, the authentication node 102 may determine that k'<K and then wait until the authentication node 102 receives at least two more encrypted match values from different worker nodes. In some embodiments, the number of needed responses may be predetermined by an entity.

The left hand side of the equation (i.e., $m_1*s_1+m_2*s_2+m_3*s_3+\ldots+m_k'*s_k'$) may be the overall decision. The authentication node 102 may determine if the overall decision based on the weights and the decrypted match values is greater than or equal to the overall authentication threshold(s). If the overall decision is greater than or equal to the overall authentication threshold, then the authentication node 102 may determine that the second biometric template and the first biometric template match. In some embodiments, after the authentication node 102 determines that the second biometric template and the first biometric template match, the authentication node 102 may determine to authenticate the interaction.

If the overall decision is less than the overall authentication threshold, then the authentication node 102 may determine that the second biometric template and the first biometric template do not match. In some embodiments, after the authentication node 102 determines that the second biometric template and the first biometric template do not match, the authentication node 102 may determine to not authenticate the interaction. In other embodiments, the authentication node 102 may prompt the user to reenter the second biometric sample.

In some embodiments, determining if the first biometric template and the second biometric template match may result in an overall match result. In some embodiments, the overall match result may be the overall decision. In other embodiments, the overall match result may be a "yes match" or a "no match." The overall match result may be a value or characters that relate to the overall decision. For example, the overall decision may be a value of 95 (out of 100), then the overall match result may be 95, or may be "yes match."

At step S740, after determining if the first biometric template and the second biometric template match, the authentication node 102 may generate an authentication response message. The authentication response message may include the overall match result and access data. In some embodiments, the authentication response message may be in response to the authentication request message.

At step S742, the authentication node 102 may transmit the authentication response message to the resource provider computer 108.

At step S744, after receiving the authentication response message, the resource provider computer 108 may generate an authorization request message. The resource provider computer 108 may transmit the authorization request message to the transport computer 110. The authorization request message may include access data. In some embodiments, the authorization request message may also include the overall match result.

In other embodiments, the authentication node 102 may generate the authorization request message and then transmit the authorization request message to the resource provider computer 108. In some embodiments, the authentication node 102 may transmit the authorization request message to the authorizing entity computer 114 via the resource provider computer 108, the transport computer 110, and the network computer 112.

At step S746, the transport computer 110 may transmit the authorization request message to the network computer 112. In some embodiments, the transport computer 110 may be associated with the resource provider computer 108 and may manage authorization requests on behalf of the resource provider computer 108.

At step S748, the network computer 112 may transmit the authorization request message to the authorizing entity computer 114.

The network computer 112, the transport computer 110, and the authorizing entity computer 114 may operate suitable routing tables to route authorization request messages using payment credentials, payment tokens, and/or other suitable identifiers.

At step S750, after receiving the authorization request message, the authorizing entity computer 114 may determine to authorize the interaction.

The authorizing entity computer 114 may issue and manage a payment account to the user which in some embodiments may be associated with the authentication node 102. The authorizing entity computer 114 may also represent a verification entity that may choose to verify the user. In some embodiments, the authorizing entity computer 114 may be able to authorize transactions that involve the payment account. Before authorizing a transaction, the authorizing entity computer 114 may authenticate access data, such as payment credentials, received in the authorization request message, and check that there is available credit or funds in an associated payment account. The authorizing entity computer 114 may also receive and/or determine a risk level associated with the transaction, and may weigh the risk when deciding whether or not to authorize the interaction.

At step S752, after approving or declining the interaction, the authorizing entity computer 114 may generate an authorization response message communicating the approval or decline of the transaction.

At steps S754-S760, the authorizing entity computer 114 may transmit the authorization response message to the authentication node 102 via the network computer 112, the transport computer 110, and the resource provider computer 108. The authentication node 102 may receive the authorization response message from the authorizing entity computer 114.

In some embodiments, at the end of the day or at any other suitable period of time after the authorization response message is received by the resource provider associated with the resource provider computer 108, a clearing and settlement process may be performed between an acquirer associated with the transport computer 110, the entity associated with the network computer 112, and an authorizing entity represented by authorizing entity computer 260.

After the authentication node 102 receives the authorization response message, the authentication node 102 may proceed with the interaction with the resource provider computer 108 if the authorizing entity computer 114 authorized the interaction.

Figure 8:
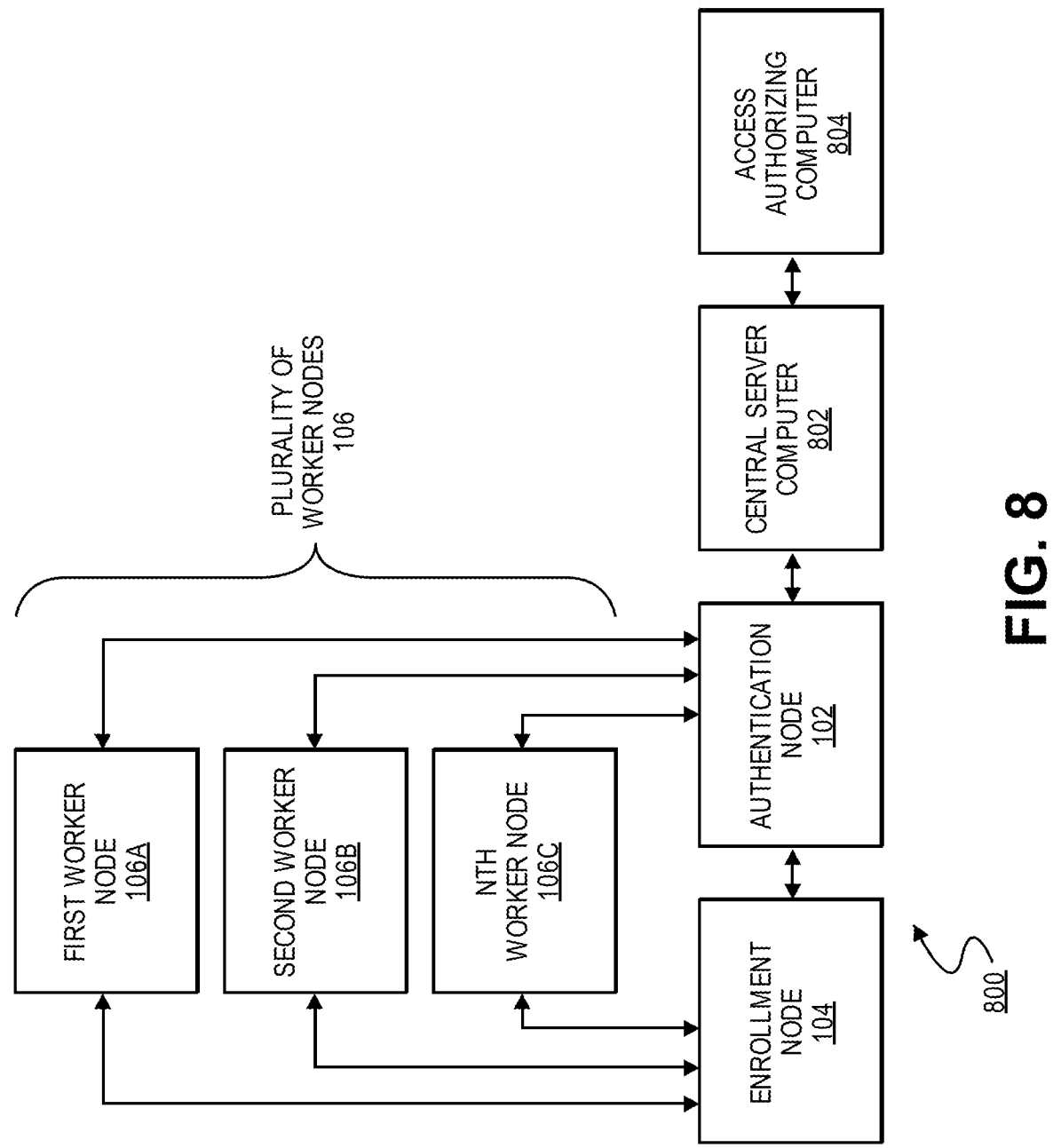
FIG. 8 shows a block diagram of an access system according to an embodiment of the invention.

FIG. 8 shows a block diagram of an access system 800 comprising a number of components according to an embodiment of the invention. The access system 800 comprises the authentication node 102, the enrollment node 104, the plurality of worker nodes 106 including the first worker node 106A, the second worker node 106B, and the Nth worker node 106C, as well as a central server computer 802, and an access authorizing computer 804.

The authentication node 102, the enrollment node 104, and the plurality of worker nodes 106 may be in operative communication as described in FIG. 1. Further, the authentication node 102 may be in operative communication with the central server computer 802, which may be in operative communication with the access authorizing computer 804.

For simplicity of illustration, a certain number of components are shown in FIG. 8. It is understood, however, that embodiments of the invention may include more than one of each component. For example, there may be many worker nodes. In one example, there may be five worker nodes, in another, there may be fifty worker nodes.

The components in the access system 800 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The authentication node 102, the enrollment node 104, the plurality of worker nodes 106 including the first worker node 106A, the second worker node 106B, and the Nth worker node 106C have been described previously and need not be repeated here.

The central server computer 802 may be a server computer. In some embodiments, the user of the authentication node 102 may initiate an interaction with the central server computer 802 via the authentication node 102. In some embodiments, the central server computer 802 may generally be located at a building. The central server computer 802 may control access to the building via locks on the entryways.

The access authorizing computer 804 may be a server computer operated by an entity associated with the central server computer 802. The access authorizing computer 804 may be capable of authorizing access. For example, the access authorizing computer 804 may be capable of authorizing a user to enter a building.

In some embodiments, a user may initiate an interaction with the central server computer 802 via the authentication node 102. The interaction may be a request to enter a building. For example, the user may have previously entered a first biometric template with an enrollment node 104, such as a computer supplied by their landlord. When attempting to enter the building, the user may scan their fingerprint on an authentication node 102, such as a fingerprint scanner on a security device at the building. The security device may divide the entered second biometric template (template of the user's fingerprint) into a plurality of second biometric template parts. The security device may then encrypt the plurality of second biometric template parts and may transmit the plurality of encrypted second biometric template parts to a plurality of worker nodes throughout the building. The plurality of worker nodes may respectively compare the two encrypted biometric template parts and then transmit the resulting encrypted match values to the security device. The security device may then transmit an authorization request message to a central computer which may route the authorization request message to the access authorizing computer 804. The access authorizing computer 804 may determine to authorize the user to enter the building. The access authorizing computer 804 may transmit an authorization response message to the authentication node 102, via the central server computer 802. The authentication node 102 may then unlock a door to the building if the user was authorized to enter. The user may then enter the building if their fingerprint matches a fingerprint stored in the plurality of worker nodes and they have been authorized to enter.

In some embodiments, the security device may determine to allow the user to enter the building without generating the authorization response message, depending on if only authentication is needed. In other embodiments, both authentication and authorization may be needed.

Embodiments of the invention have a number of advantages. One advantage is that once the biometric templates are encrypted, there is no need to decrypt the biometric templates. This is highly beneficial over current systems in which the stored encrypted biometric template must be decrypted in order to be compared with a decrypted second biometric template. Since the encrypted biometric templates are not decrypted they cannot be easily compromised by malicious parties.

Further, the plurality of worker nodes that store the encrypted biometric template parts need not be trusted since the biometric templates are never decrypted. A worker node of the plurality of worker nodes does not have access to the plain text biometric template or the biometric template parts.

Embodiments of the invention have another advantage of dividing the biometric templates into encrypted biometric template parts. Since no worker node ends with the whole encrypted biometric template, even if the worker node were malicious, that node would only be able to compromise a biometric template part rather than the whole biometric template.

Further, if the malicious party were to try to use a compromised biometric template part to perform authentication they would be unable to do so, since the authentication node determines if the number of responses is greater than or equal to the number of needed responses. The malicious party would have to compromise many worker nodes, even though they would have no knowledge of which worker nodes to compromise. Furthermore, each worker node of the plurality of worker nodes may have different encryption keys, thus making it even more difficult to compromise many worker nodes.

Another advantage is that this framework allows for having heterogeneous biometric comparison algorithms being used by different worker nodes. Each worker node and even the authentication node may be oblivious to the underlying algorithms being used, as long as they can use a normalized output/score from the comparison function.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by an authentication node, a plurality of encrypted match values, wherein the plurality of encrypted match values were formed by a plurality of worker nodes as a result of comparing a plurality of second biometric template parts derived from a second biometric template to a plurality of first biometric template parts derived from a first biometric template ;
   decrypting, by the authentication node, the plurality of encrypted match values resulting in a plurality of decrypted match values; and
   determining, by the authentication node, if the first biometric template matches the second biometric template using the plurality of decrypted match values,
   wherein determining, by the authentication node, if the first biometric template matches the second biometric template using the plurality of decrypted match values, further comprises:
   determining, by the authentication node, a weight associated with each decrypted match value of the plurality of decrypted match values;
   determining, by the authentication node, an overall authentication threshold;
   comparing, by the authentication node, a number of worker nodes that responded to a number of needed responses; and
   determining, by the authentication node, if an overall decision based on the weights and the decrypted match values is greater than or equal to the overall authentication threshold.

2. The method of claim 1 further comprising:
   dividing, by the authentication node, the second biometric template resulting in the second biometric template parts;
   encrypting, by the authentication node, the second biometric template parts resulting in encrypted second biometric template parts; and
   transmitting, by the authentication node, the encrypted second biometric template parts to the plurality of worker nodes.

3. The method of claim 1 further comprising:
   transmitting, by the authentication node, if the first biometric template matches the second biometric template, an authorization request message to an authorizing entity computer; and
   receiving, by the authentication node, an authorization response message from the authorizing entity computer.

4. The method of claim 3, wherein the authorization request message comprises a primary account number and an amount.

5. The method of claim 1, wherein the first biometric template is derived from a face data, fingerprint data, or retina data.

6. The method of claim 1, wherein biometric template parts of the first biometric template parts are of equal size.

7. An authentication node comprising:
   a processor;
   a memory device; and
   a computer-readable medium coupled to the processor, the computer-readable medium comprising code executable by the processor for implementing a method comprising:
   receiving a plurality of encrypted match values, wherein the plurality of encrypted match values were formed by a plurality of worker nodes as a result of comparing a plurality of second biometric template parts derived from a second biometric template to a plurality of first biometric template parts derived from a first biometric template ;
   decrypting the plurality of encrypted match values resulting in a plurality of decrypted match values; and
   determining if the first biometric template matches the second biometric template using the plurality of decrypted match values,
   wherein the step of determining, if the first biometric template matches the second biometric template using the plurality of decrypted match values, further comprises:
   determining a weight associated with each decrypted match value of the plurality of decrypted match values;
   determining an overall authentication threshold;
   comparing a number of worker nodes that responded to a number of needed responses; and
   determining if an overall decision based on the weights and the decrypted match values is greater than or equal to the overall authentication threshold.

8. The authentication node of claim 7, wherein the method further comprises:
   dividing the second biometric template resulting in the second biometric template parts;
   encrypting the second biometric template parts resulting in encrypted second biometric template parts; and
   transmitting the encrypted second biometric template parts to the plurality of worker nodes.

9. The authentication node of claim 7, wherein the method further comprises:
  transmitting if the first biometric template matches the second biometric template, an authorization request message to an authorizing entity computer; and
  receiving an authorization response message from the authorizing entity computer.

10. The authentication node of claim 9, wherein the authorization request message comprises a primary account number and an amount.

11. The authentication node of claim 7, wherein the first biometric template is derived from a face data, fingerprint data, or retina data.

12. The authentication node of claim 7, wherein biometric template parts of the first biometric template parts are of equal size.

13. A system comprising:
  an authentication node comprising,
  a processor,
  a memory device, and
  a computer-readable medium coupled to the processor, the computer-readable medium comprising code executable by the processor for implementing a method comprising,
  receiving a plurality of encrypted match values, wherein the plurality of encrypted match values were formed by a plurality of worker nodes as a result of comparing a plurality of second biometric template parts derived from a second biometric template to a plurality of first biometric template parts derived from a first biometric template ,
  decrypting the plurality of encrypted match values resulting in a plurality of decrypted match values; and
  determining if the first biometric template matches the second biometric template using the plurality of decrypted match values,
  wherein the step of determining, if the first biometric template matches the second biometric template using the plurality of decrypted match values, further comprises:
  determining a weight associated with each decrypted match value of the plurality of decrypted match values;
  determining an overall authentication threshold;
  comparing a number of worker nodes that responded to a number of needed responses; and
  determining if an overall decision based on the weights and the decrypted match values is greater than or equal to the overall authentication threshold; and
  the plurality of worker nodes.

* * * * *